Feb. 6, 1934.    J. M. HAIT    1,945,776
SUBMERSIBLE BEARING
Filed Dec. 12, 1930    2 Sheets-Sheet 1
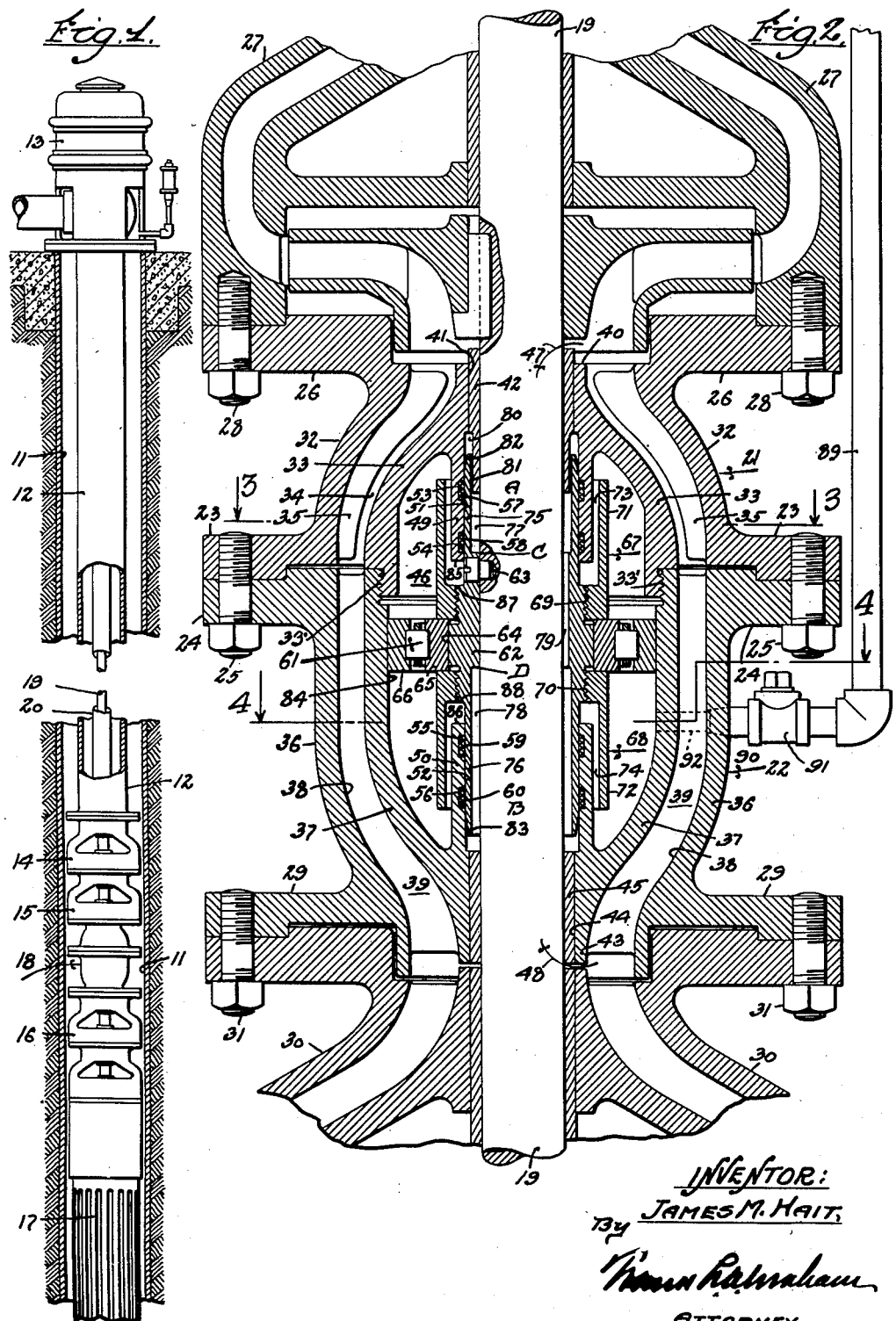
INVENTOR:
JAMES M. HAIT,
By
ATTORNEY.

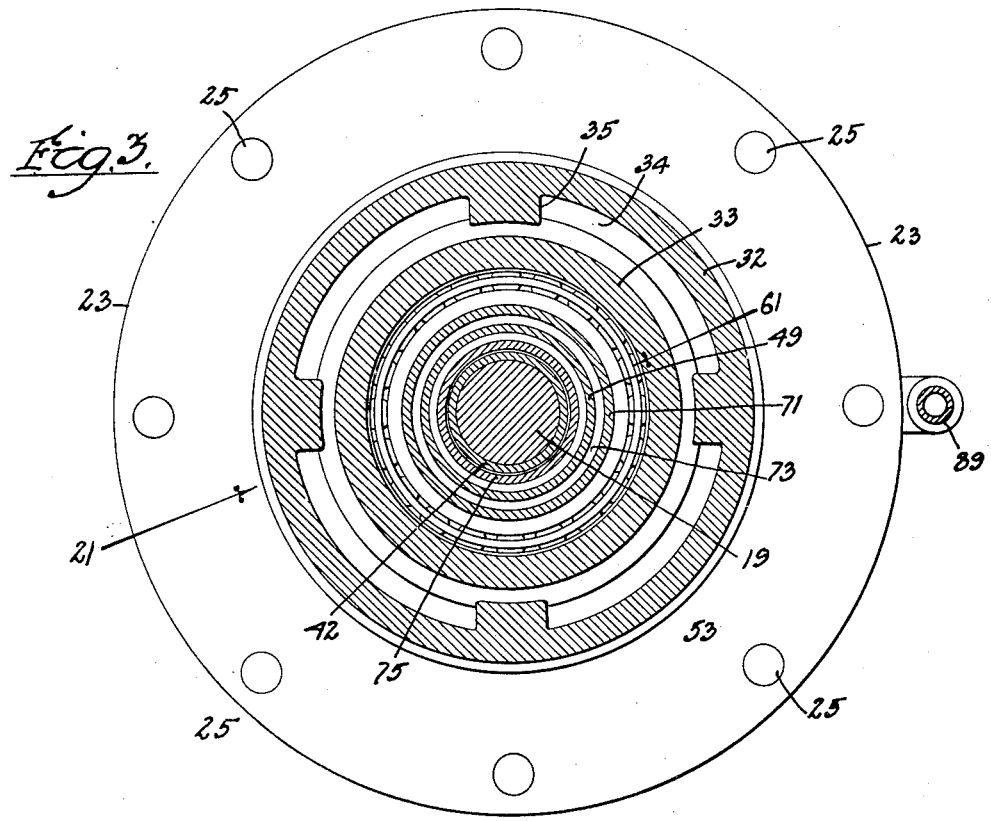
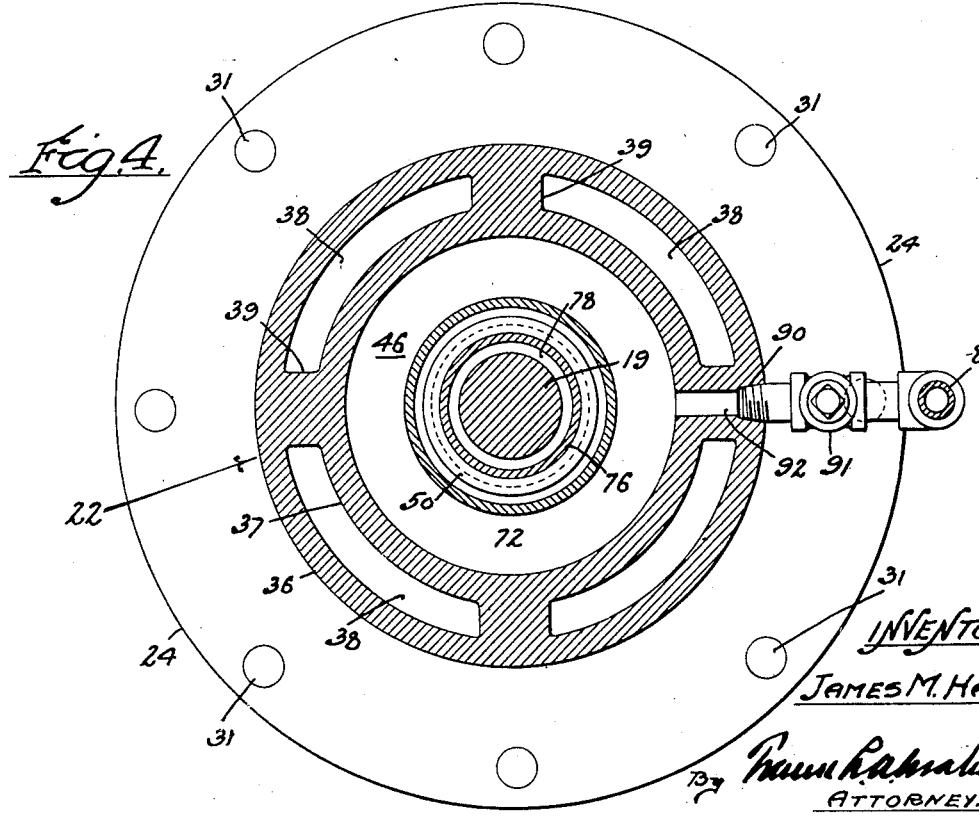

Patented Feb. 6, 1934

1,945,776

UNITED STATES PATENT OFFICE 1,945,776

SUBMERSIBLE BEARING

James M. Hait, Bell, Calif., assignor to Food Machinery Corporation, a corporation of Delaware Application December 12, 1930
Serial No. 501,780

8 Claims. (Cl. 308—168)

This invention relates to a bearing structure, and deals with a bearing capable of operating under liquid. The type of bearing embodied in this invention finds general usefulness wherever it becomes necessary to operate a submerged bearing, and has been designed with particular reference for use in vertical rotary pumps. The vertical multiple stage rotary pump for which the bearing is especially adapted comprises a series of interconnected pump bowls with impellers rotatably mounted therein, said bowls being supported in a well on the lower end of a discharge pipe, and said impellers being supported in the bowls and operated therein by a shaft extending through said discharge pipe and through said bowls. In order to properly journal the shaft extending through the bowls, the general practice is to incorporate a bearing between adjacent bowls of the pump, one or more of such bearings being used as the occasion demands. Such a bearing necessarily operates under water, and considerable difficulty has been experienced in protecting a bearing of this type from ingress of water which carries sand to the vital parts of the bearing. It is obvious that if sand is not prevented from entering the bearing, the wearing parts of the bearing are subjected to excessive wear, and the life of the bearing is considerably reduced. The wearing down of the bearing parts results in a whipping of the shaft, which sets up a vibration in the pump that not only materially reduces the efficiency of the pump, but sooner or later requires that the pump be pulled and new bearings installed. I am aware that in submersible bearings heretofore employed, attempts have been made to prevent sand reaching the vital parts of the bearing by locating the bearing in an isolated chamber, and interposing grease between the bearing and any water that cannot be prevented from entering the chamber. This, however, has proven ineffectual, due to the fact that in forming isolated chambers in bearings of this nature, the chamber thus formed must necessarily have two entrances which are generally closed by sliding contacts. Such sliding contacts are known to fail to prevent passage of water therethrough when pressure is exerted in the pump. The result has been that, due to a differential in pressure on opposite entrances to the isolated chamber, water flows through said chamber and carries sand to the bearing.

My invention provides an isolated chamber having the usual two entrances, with the bearing located in the chamber. However, my invention departs from the usual in that the hydrostatic head at each entrance to the chamber is equalized with the result that there is no more tendency for water to enter at one of the entrances than at the other, and, consequently, no water flows through the chamber. This arrangement takes into recognition the fact that it is impossible to absolutely prevent all water from passing the sliding contacts at the entrances to the chamber. Further, I place the entrances to the chamber on opposite sides of the bearing, and enclose the bearing in a body of lubricant, preferably comparatively hard grease. The result is that the pressure at the entrances to the chamber being equal, equal hydrostatic pressure will be applied to opposite sides of the grease body enclosing the bearing. This arrangement will be readily appreciated as providing a means for preventing any flow of water through the vital parts of the bearing, and in conjunction with the body of grease surrounding the bearing proper, which acts as a diaphragm between the two heads of water, all possibility of water flowing through, or of sand penetrating to the bearing, is eliminated. Accordingly, it becomes a prime object of this invention to provide a bearing which may be incorporated in a pump of the character described with means for preventing the passage of the water through said bearing parts. As a means toward this end, I provide a bearing unit that may be interposed between the bowls of a rotary pump, and in this unit I mount an antifriction bearing and isolate said bearing in a chamber that embodies the necessary two entrances, but with the entrances disposed on opposite sides of the bearing, and in addition I balance the hydrostatic head at each entrance by interconnecting the two heads of water outside the chamber. Under this arrangement, it is clear that any water which passes the sliding contacts will enter from the opposite sides of the bearing under the same pressure, and that instead of passing through the bearing will encounter the grease body on opposite sides, and will tend to force the grease into the vital parts of the bearing. It is to be understood in this respect that means is also embodied in this invention for forcing a lubricant into the chamber in which said bearing is mounted.

A noteworthy feature of my invention resides in the design of the parts and the arrangement of the parts, whereby a substantial and durable structure is provided which is capable of being readily assembled and disassembled for inspection and replacement of parts such as packing members in the sliding contacts, etc.

Accordingly, further objects of this invention are:

To provide in a bearing of the character described an isolated chamber containing an antifriction bearing member with slidable contact closures on opposite sides of said bearing member for retarding penetration of water into said chamber;

To provide means in a bearing of the foregoing characteristics for causing any water that penetrates into the chamber containing the antifriction bearing member to enter on opposite sides of said antifriction bearing member and to be hydrostatically balanced;

To specifically provide a water passage through the hub of the bearing outside the chamber to balance the hydrostatic pressure on opposite sides of the bearing in the chamber;

To provide a bearing of the character described in which a diaphragm of lubricant enclosing the vital parts of the bearing is interposed between water which may enter from opposite sides of the bearing;

To provide a structure for a bearing of the foregoing type that is readily assembled and disassembled and composed of parts arranged in a manner conducive to long life; and To provide a bearing unit of the character described adapted to be incorporated in a rotary pump such as contemplated in this invention.

Other objects and advantages will become apparent as the description proceeds in conjunction with the drawings, in which—

Fig. 1 is a utility view showing the manner in which my invention would be incorporated in a rotary pump;

Fig. 2 is a vertical section of the bearing unit embodied in this invention;

Fig. 3 is a cross-sectional view taken on line 3—3 of Fig. 2; and

Fig. 4 is a cross-sectional view on line 4—4 of Fig. 2.

Referring to the drawings, and particularly to Fig. 1, for purposes of illustration, I have shown my invention as it would be embodied in a vertical rotary pump operating in a well. As is customary, the well is provided with a casing 11, and in the casing 11, I have shown a discharge pipe 12 suspended therein from a head 13. Upon the lower end of the discharge pipe 12, I have illustrated a plurality of pumping units designated 14, 15, and 16, and have shown at the bottom of the pump units a conventional strainer 17. Between the units 15 and 16, I have incorporated my invention, designated in its entirety 18. It is customary to drive the impellers in the pump units by means of a shaft 19 carried within a protective casing 20, said shaft 19 being operably connected to the head 13, which is power-operated, to drive the impellers within the pump units.

In Fig. 2, I have shown in detail the construction of my bearing units, such as is designated 18 in Fig. 1. In this view, the structure comprises an upper casing member 21 and a lower casing member 22 provided with flanges 23 and 24, respectively, which are adapted to be secured together by means, such as bolts 25. The member 21 is upwardly provided with a flange 26 for attaching the bearing to a pump unit 27 by any suitable means such as bolts 28. The lower unit 22 is downwardly provided with a flange 29 adapted to receive the upper end of a pump unit 30, and be secured thereto by means such as bolts 31.

Taking up a detailed description of the units 21 and 22 separately, it is seen that the unit 21 comprises an outer casing wall 32 and a separate casing wall 33 annularly spaced therefrom to provide a water passage 34. Vanes designated 35 extend from the casing wall 32, and serve to prevent a whirling action of the water as it passes through the passage 34. The lower member 22 comprises an outer casing wall 36 and an inner casing wall 37 annularly spaced therefrom to form a water passage 38. Ribs, such as shown at 39, connect the two casings. The casing walls 33 and 37 are screw-threadedly joined as shown at 33', and in conjunction with the flanges 23 and 24 form a water-tight connection between the units 21 and 22. The structure thus far described provides a unit having an annular water passage consisting of passages 34 and 38 therethrough. The upper end of the casing wall 33, which is reduced to form a neck 40, is bored, as shown at 41, to receive a bushing 42, said bushing being pressed into the bore and forming a watertight fit therewith. A similar structure exists on the lower end of the inner casing wall 37, and consists of a reduced neck 43 having a bore 44 therethrough, and a bushing 45 pressed into said bore to form a water seal therewith. The bushings 42 and 45 are adapted to rotatably receive the shaft 19, which extends to the power-operated head 13. By virtue of the casing walls 33 and 37, and the shaft 19, which latter passes through the bushings 42 and 45, an isolated chamber 46 is formed within the inner walls 33 and 37. It is apparent from the foregoing that the only possible way water can penetrate to the chamber 46 is between the bushings 42 and 45, and the shaft 19. It is known, however, that the fit between the bushings 42 and 45 and the shaft 19 cannot be brought to such a closeness as to prevent the passage of a certain amount of water therethrough in the direction of the arrows 47 and 48. This invention, therefore, takes advantage of this fact, and provides means for hydrostatically balancing the pressure of such water as does pass through the bushings and causing such pressure to bear against opposite sides of a grease body which encloses the vital parts of the bearing. As a means of attaining this end, I equip the casing walls 33 and 37 with inwardly extending circular walls 49 and 50, respectively, said walls being provided with inner bores 51 and 52, respectively, which are of larger diameter than the shaft 19. I also provide annular recesses 53 and 54 in the wall 49 and similar recesses 55 and 56 in the wall 50, said recesses being for the purpose of installing packing rings 57, 58, 59, and 60, respectively.

Means is provided for mounting an antifriction bearing 61 on the shaft 19, and for supporting said bearing in the isolated chamber 46, such means consisting of a hub 62 mounted on the shaft 19 and retained thereon by means of a set-screw 63. The hub 62 is provided with an outwardly extending shoulder 64, which is adapted to receive the inner race 65 of the bearing 61, while the outer race 66 is arranged to bear against the inner surface of the casing wall 37.

The means for retaining the bearing 61 upon the shoulder 64 of the hub 62 consists of skirt members 67 and 68 screw-threadedly mounted upon the hub 62, as shown at 69 and 70, respectively, and adapted to engage opposite sides of the inner race 65. The members 67 and 68 are provided with extending circular walls or skirts 71 and 72, respectively, which are arranged to be spaced from the walls 49 and 50 to form annular spaces 73 and 74, respectively. The hub 62 is provided with circular walls 75 and 76 extending in opposite directions from the hub. The internal diameter of these walls is greater than the diameter of the shaft which results in annular spaces 77 and 78 surrounding said shaft above and below the bearing 61, and the outer surfaces of the walls 75 and 76, respectively, are arranged to slidably engage the packing members 57, 58, and 59, 60, respectively, thus forming sliding contact closures to entrances A and B, respectively, to the chamber 46 on opposite sides of the bearing 61. It will be observed that the hub member 62 engages the shaft 19 between the points C and D only. It will also be observed that as a means of interconnecting the flow of water which enters in the direction of the arrows 47 and 48, I incorporate a passage 79 in the hub member 62 through that portion of the hub member from C to D which engages the shaft 19. In order to prevent sand accumulating on the packing member 57 by force of gravity, I form an annular chamber 80 between the member 49 and the bushing 42 by cutting away portions of each, and the member 75 is adapted to extend into the chamber 80 and form a working fit therewith as indicated at 81. The outer ends of the members 75 and 76 are slightly tapered as shown at 82 and 83, respectively, so that in assembling the members 75 and 76 will readily pass their respective packing rings. Since in pumps of this nature there is a slight vertical movement imparted to the shaft 19, I embody structural features which are arranged to permit such movement. In this respect it is pointed out that the outer race 66 of the bearing 61 engages a straight portion 84 upon the inner surface of the inner wall 37, and that the annular chamber 80 extends above the tapered end 82 of the member 75, and also that the inner ends of the members 49 and 50, as shown at 85 and 86, respectively, are spaced from tranverse walls 87 and 88 connecting the extended circular walls 71-75 and 72-76, respectively.

This invention also embodies means for introducing a suitable lubricant into the chamber 46, such means preferably consisting of a feed pipe 89 leading from a source of supply on the surface and connected to the member 22 as shown at 90; preferably the feed pipe 89 has a unidirectional valve 91 installed therein. The feed pipe 89 is connected to the inner chamber 46 by means of a passage 92 formed in one of the ribs 39.

In practice, the chamber 46 would be filled with any suitable lubricating medium, such as comparatively hard grease, and the grease would fill the annular spaces 73 and 74, and would penetrate to the packing rings 54 and 55. It is apparent that in operation any water penetrating between the bushings 42 and 45, and the shaft 19, would first communicate through the passage 79 provided in the hub 62, and that as the pressure tended to force the water past the packing members it would be equalized on opposite sides of the bearing 61. It is, therefore, obvious that as soon as the water encounters the grease in the bearing, an equal pressure would be applied to opposite sides of the grease surrounding the bearing, and that the only result produced would be a pressure upon the grease tending to force the grease into the working parts of the bearing. This arrangement will be recognized as providing a novel submersible bearing whereby water is prevented from flowing through the vital parts of said bearing by hydrostatically balancing the pressure of water on opposite sides of said bearing, and by further utilizing the pressure of said water to force grease into the working parts of the bearing.

Although I have shown and described a specific embodiment of my invention, nevertheless I am aware that the usefulness of my invention is not dependent upon the specific structural arrangement shown. Accordingly, I intend this disclosure to include all such modifications and alterations that may be resorted to in the process of manufacture which, under the doctrine of equivalents, come within the scope of the appended claims.

I claim as my invention:

1. For use with a drive shaft, a submersible bearing comprising: a casing having a shaft opening therethrough and an isolated chamber therein; a hub mounted upon said shaft within said casing; and an antifriction bearing unit mounted on said hub and engaging said casing within said chamber, said chamber having fluid entrances on opposite sides of said bearing unit and said hub having a fluid passage therethrough for hydrostatically balancing the pressure of fluid entering through said shaft opening.

2. For use with a drive shaft, a submersible bearing comprising: a casing having a shaft opening therethrough and a chamber therein; means associated with said shaft and said casing for forming two fluid entrances to said chamber, said means including a hub mounted on said shaft, said hub having circular walls extending from both sides thereof substantially concentric with said shaft; and circular casing walls extending inwardly into said chamber adapted to slidably engage the outer surface of the walls extending from said hub, said hub having a fluid passage therethrough communicating with the fluid entrances in said casing.

3. For use with a drive shaft, a submersible bearing comprising: a casing having a shaft opening therethrough and a chamber therein; means associated with said shaft and said casing for forming two fluid entrances to said chamber, said means including a hub mounted on said shaft, said hub having circular walls extending from both sides thereof substantially concentric with said shaft circular casing walls extending inwardly into said chamber adapted to slidably engage the outer surface of the walls extending from said hub; and means for mounting an antifriction bearing unit upon said hub, said bearing unit extending into said chamber and engaging the inner surface of the wall of said chamber, said hub having a fluid passage therethrough communicating with the fluid entrances in said casing.

4. For use with a drive shaft, a submersible bearing comprising: a casing having a shaft opening therethrough and a chamber therein; means associated with said shaft and said casing for forming two fluid entrances to said chamber, said means including a hub mounted on said shaft, said hub having circular walls extending from both sides thereof substantially concentric with said shaft; circular casing walls extending inwardly into said chamber adapted to slidably engage the outer surface of the walls extending from said hub; and means for mounting an antifriction bearing unit upon said hub, said bearing unit extending into said chamber and engaging the inner surface of the wall of said chamber, said last mentioned means including screw-threaded members mounted on said hub on opposite sides of said bearing unit, said hub having a fluid passage therethrough communicating with the fluid entrances in said casing.

5. For use with a drive shaft, a submersible bearing comprising: a casing having a shaft opening therethrough and a chamber therein; means associated with said shaft and said casing for forming two fluid entrances to said chamber, said means including a hub mounted on said shaft, said hub having circular walls extending from both sides thereof substantially concentric with said shaft; circular casing walls extending inwardly into said chamber adapted to slidably engage the outer surface of the walls extending from said hub; and screw-threaded skirt members mounted on said hub and having extending circular walls extending past said inwardly extending circular walls on said casing and forming an annular space therebetween.

6. For use with a drive shaft, a submersible bearing comprising: a casing having a shaft opening therethrough and a chamber therein; means associated with said shaft and said casing for forming two fluid entrances to said chamber, said means including a hub mounted on said shaft, said hub having circular walls extending from both sides thereof substantially concentric with said shaft; circular casing walls extending inwardly into said chamber adapted to slidably engage the outer surface of the walls extending from said hub; means for mounting an antifriction bearing unit upon said hub, said bearing unit extending into said chamber and engaging the inner surface of the wall of said chamber; and externally accessible means for introducing lubricant into said chamber between said fluid entrances, said lubricant entirely surrounding the moving parts of said bearing unit, said hub having a fluid passage therethrough communicating with the fluid entrances in said casing.

7. A bearing adapted to be incorporated in a rotary pump embodying a casing having a fluid passage therethrough and a chamber therein; means for attaching said casing to a bowl of the pump, said chamber being reduced at opposite ends to form a shaft opening through said casing adapted to rotatably receive the shaft of said pump; a hub mounted on said shaft and forming slidable closures to said chamber on opposite sides of said hub, there being a fluid passage through said hub for equalizing the fluid pressure on opposite sides of said hub; and an antifriction bearing member mounted on said hub and engaging the inner surface of said chamber wall.

8. A bearing adapted to be incorporated in a rotary pump embodying a casing having a fluid passage therethrough and a chamber therein; means for attaching said casing to a bowl of the pump, said chamber being reduced at opposite ends to form a shaft opening through said casing adapted to rotatably receive the shaft of said pump; a hub mounted on said shaft and forming slidable closures to said chamber on opposite sides of said hub, there being a fluid passage through said hub for equalizing the fluid pressure on opposite sides of said hub; an antifriction bearing member mounted on said hub and engaging the inner surface of said chamber wall; and means for permitting vertical displacement of said bearing member with respect to said casing, said means including straight portions in the wall of said chamber engaging said bearing member and overlapping slidable closures to said chamber.

JAMES M. HAIT.